United States Patent [19]

Kirigaya

[11] Patent Number: 5,386,260
[45] Date of Patent: Jan. 31, 1995

[54] CAMERA HAVING INDICATOR WITH FINDER

[75] Inventor: Tadayuki Kirigaya, Tokyo, Japan

[73] Assignee: Asahi Kogaku Kogyo Kabushiki Kaisha, Tokyo, Japan

[21] Appl. No.: 117,492

[22] Filed: Sep. 7, 1993

Related U.S. Application Data

[63] Continuation of Ser. No. 792,889, Nov. 15, 1991, abandoned.

[30] Foreign Application Priority Data

Nov. 15, 1990 [JP] Japan .................. 2-119697[U]

[51] Int. Cl.6 ............ G03B 17/00; G03B 13/02
[52] U.S. Cl. .................. 354/289.12; 354/219
[58] Field of Search ........... 354/289.1, 289.11, 219; 362/29, 296

[56] References Cited

U.S. PATENT DOCUMENTS 4,041,344  8/1977  LaGiusa ............... 313/113
4,100,555  7/1978  Johnson ............... 354/166
4,101,912  7/1978  Watanbe et al. ....... 354/106
4,134,661  1/1979  Ishizaka et al. ....... 354/289
4,175,848  11/1979 Murakami et al. ..... 354/289
4,217,044  8/1980  Yamazaki et al. ..... 354/54
4,380,794  4/1983  Lawson ............... 362/296
4,429,979  2/1984  Terada ............... 354/289.1
4,462,025  7/1984  Murakami et al. ..... 340/753
4,544,252  10/1985 Tsukamoto ........... 354/289.1
4,814,811  3/1989  Saito et al. .......... 354/412

Primary Examiner—Michael L. Gellner
Assistant Examiner—Nicholas J. Tuccillo
Attorney, Agent, or Firm—Kane, Dalsimer, Sullivan, Kurucz, Levy Eisele and Richard

[57] ABSTRACT

A camera having an indicator provided in a finder optical system in which photographic information is indicated and which includes a sub-assembly having a light source and an information indicating plate. The camera includes an insertion groove in which the sub-assembly of the indicator is inserted, and an engaging device for engaging the indicator with the camera.

17 Claims, 6 Drawing Sheets

CAMERA HAVING INDICATOR WITH FINDER

This application is a continuation, of application Ser. No. 07/792,880, filed Nov. 15, 1991, now abandoned.

BACKGROUND OF THE INVENTION

1. Field of the Invention

The present invention relates to a camera having an indicator provided in a finder optical system in which photographic information is indicated.

2. Description of Related Art

As can be seen in FIG. 11, in a finder of a single lens reflex camera, the image of an object which is transmitted through a taking lens and reflected by a quick return mirror (first mirror) is converged onto a focusing plate 1 and is reflected by a roof surface 3 and a front surface (third reflecting surface) 4, of a pentagonal prism (pentagonal roof prism) 2. The object image is then made incident on an eyepiece (ocular lens) 5 to form an erect image.

In a single lens reflex camera as mentioned above, an indicator provided within the finder to indicate photographic information such as focusing and exposure conditions by using letters, characters, symbols, etc. in the field of view of the finder, has an information indicating plate secured to a camera body by machine screws. A light source which emits light onto the information indicating plate is also separately secured to the camera body through machine screws. This results in a complex and expensive assembly.

SUMMARY OF THE INVENTION

The primary object of the present invention is to provide a camera with a finder optical system having a simple and inexpensive indicator which can be easily assembled.

To achieve the object mentioned above, according to the present invention, there is provided a camera having an indicator which is provided in a finder optical system wherein photographic information is indicated, the indicator including a sub-assembly having a light source and an information indicating plate. The camera further includes a means for inserting said indicator into said camera and a means for engaging said indicator with said camera.

With this arrangement, the indicator can be easily and firmly mounted to the camera body by merely inserting the sub-assembly of the indicator into the insertion groove by way of insertion means. This simplifies the assembly operation and thus reduces the manufacturing cost of the camera.

Preferably, a hollow pentagonal mirror is secured to a mirror receptacle (mirror sheet) which is secured to the camera body. The indicator within the finder may then be mounted to the mirror receptacle. Alternatively, the invention could be applied to a finder having a pentagonal roof prism.

In a preferred embodiment, an insertion groove is provided on one side of the mirror receptacle, so that the indicator can be inserted in the insertion groove. The mirror receptacle has an engaging hole in which the indicator can be engaged to ensure a firm connection therebetween.

Preferably, the indicator comprises a casing which is provided with an engaging hook to be engaged in the engaging hole. The casing of the indicator can be provided with separate chambers separated by separation walls. In this case, light sources (LED's) are provided in the respective separate chambers. Furthermore, each of the separate chambers is provided with an oblique reflecting surface which reflects light emitted from the associated light sources in the eyepiece direction of a finder optical system optical path.

Preferably, an information indicating plate is provided on the casing of the indicator and is provided thereon with predetermined information in the form of letters or symbols which permit the passage of light, so that light emitted from said light sources and reflected by said oblique reflecting surfaces is transmitted through said letters or symbols.

The separate chambers can be coated with reflective layers of aluminum or a white material by a vacuum evaporation process to define the reflecting surfaces.

The present disclosure relates to subject matter contained in Japanese utility model application No. 2-119697 (filed on Nov. 15, 1990) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 9:
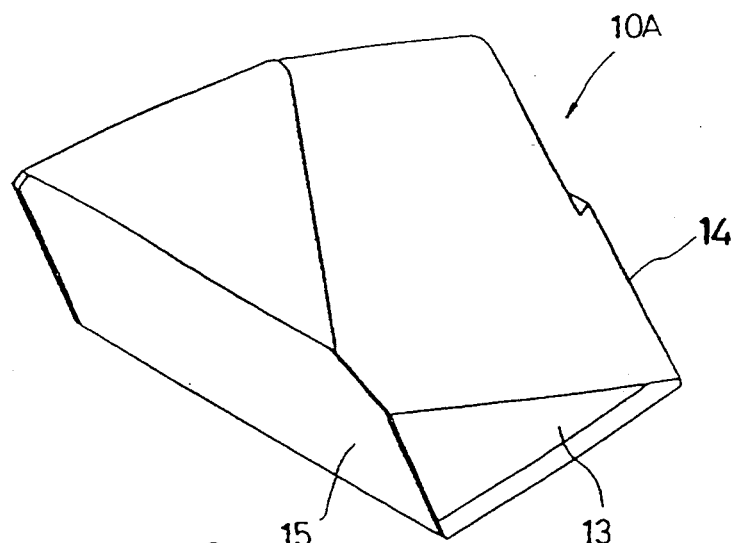
FIG. 9 is a perspective view of a pentagonal mirror, used in the present invention.
Figure 10:
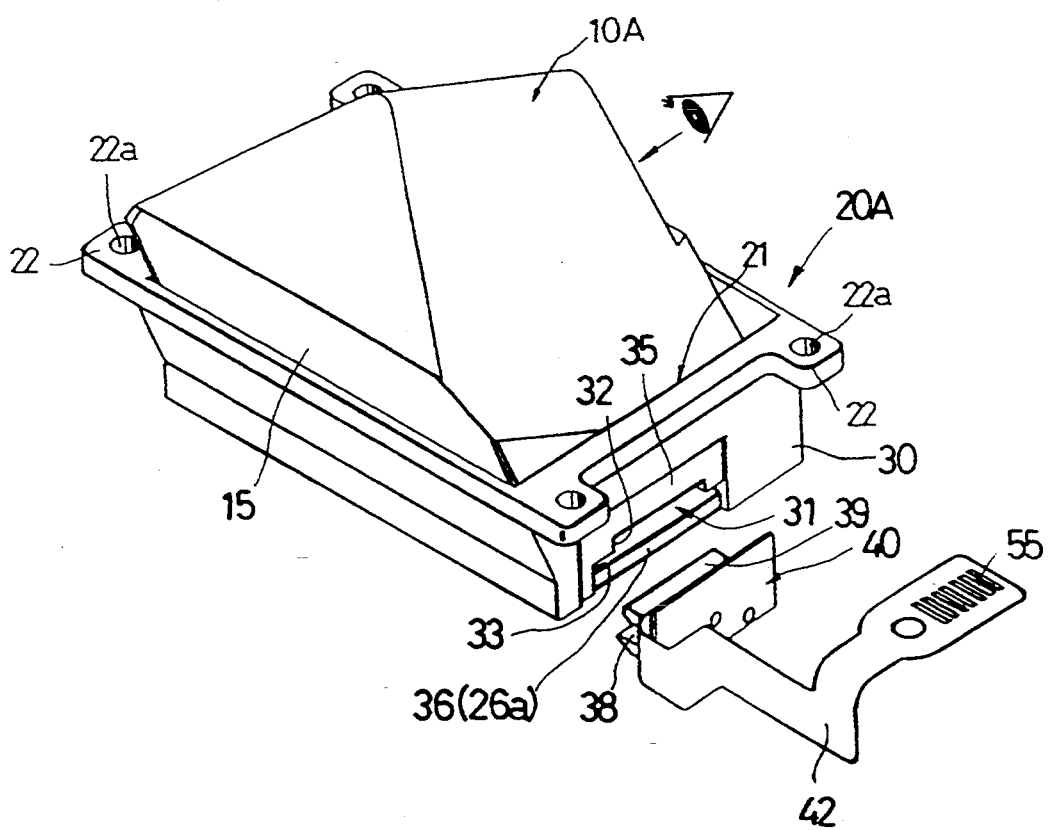
FIG. 10 is a perspective view of a mirror sheet to which a pentagonal mirror is connected; and, FIG. 11 is a longitudinal sectional view of a conventional finder in which a pentagonal prism is employed.
Figure 11:
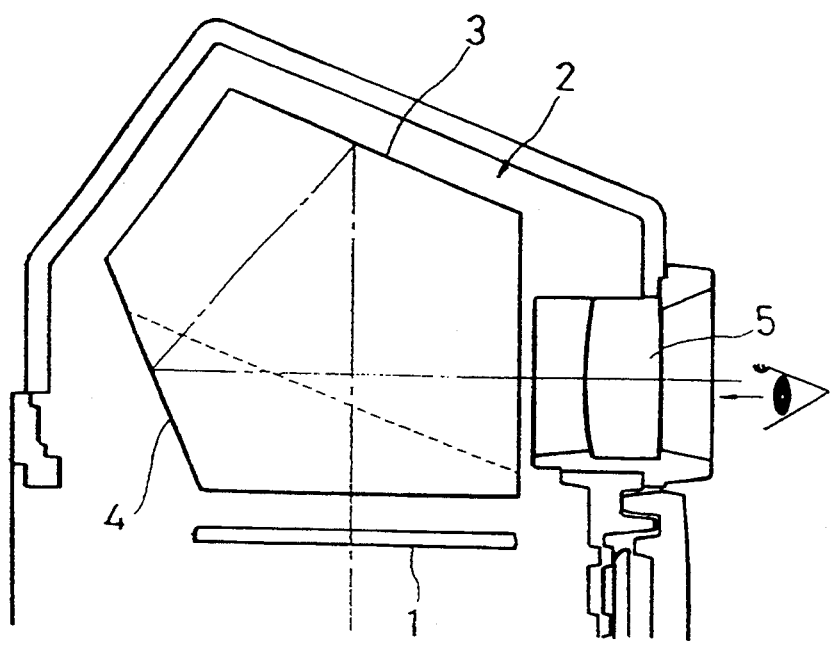

In FIGS. 9 and 10, the conventional solid pentagonal prism shown in FIG. 11 is replaced with a hollow pentagonal mirror 10A having a hollow body with reflecting mirrors which define the roof surface 3 and the third reflecting surface 4. The hollow pentagonal mirror 10A is lighter and less expensive than the solid pentagonal prism. The hollow pentagonal mirror 10A is secured to a camera body through a mirror receptacle (mirror sheet) 20A. Alternatively, the invention could be applied to a finder having a pentagonal roof prism.

The hollow pentagonal mirror 10A shown in FIGS. 9 and 10 is provided with the roof surface and the third reflecting surface (not shown) on its inner surface wall, as mentioned above, and includes right and left vertical side surfaces 13, a vertical rear surface 14, and an oblique front surface 15.

Figure 1:
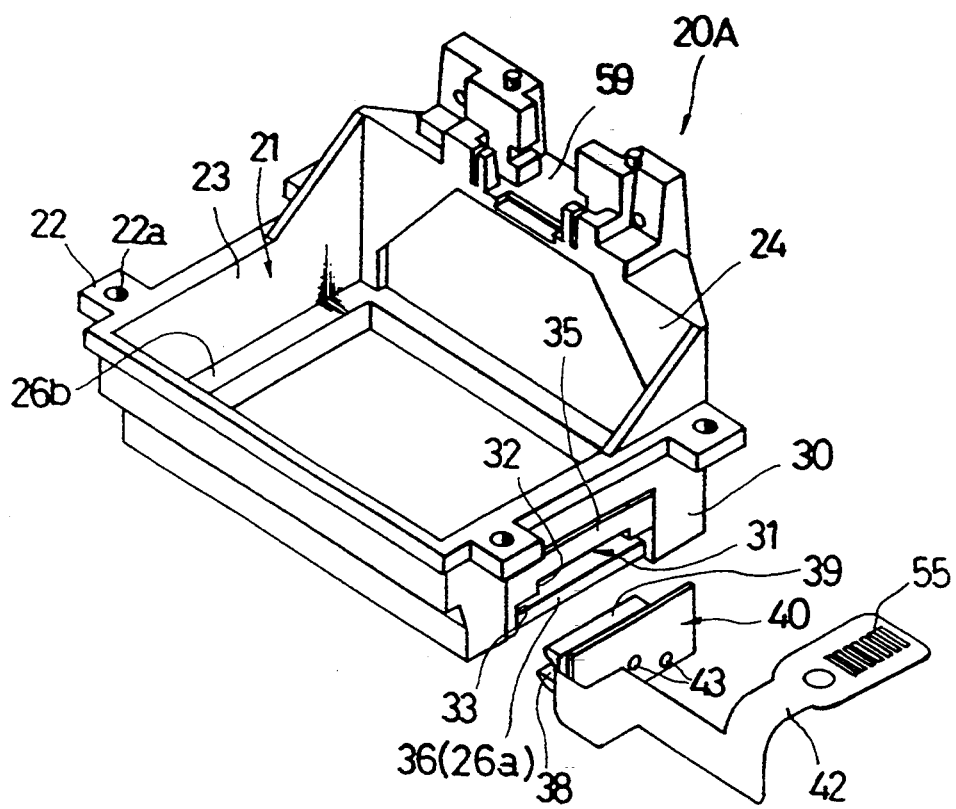
FIG. 1 is a perspective view of a supporting mechanism of an indicator within a finder, according to the present invention.
Figure 2:
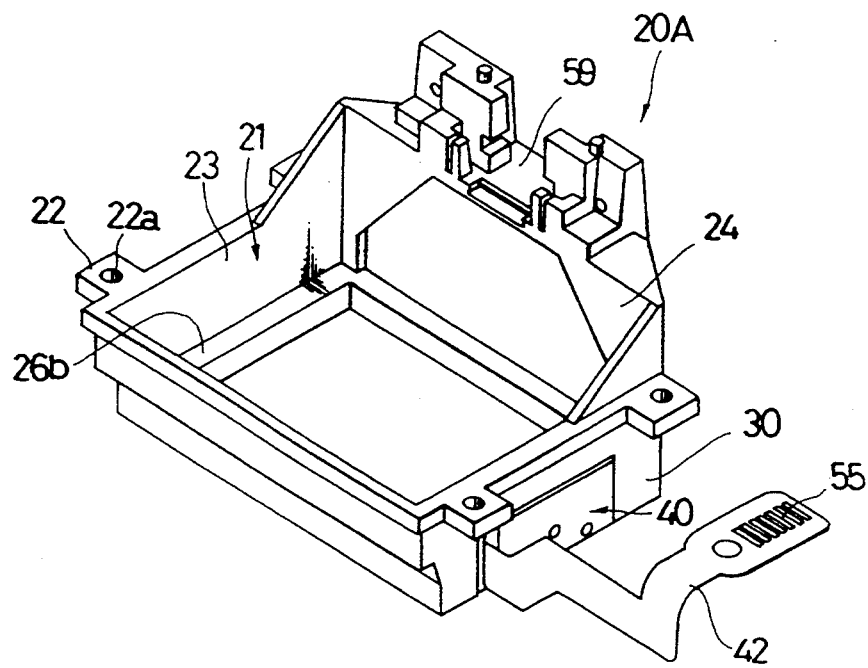
FIG. 2 is a perspective view of an indicator within a finder, mounted to a mirror receptacle.
Figure 3:
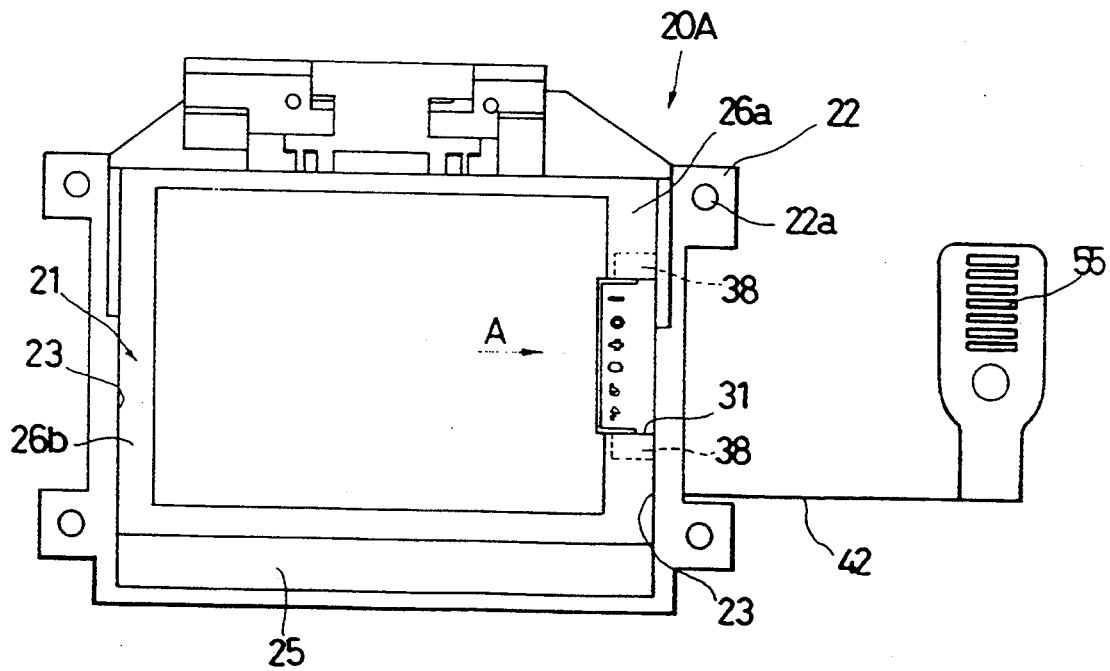
FIG. 3 is a plan view of FIG. 2.

The mirror receptacle 20A which receives therein the hollow pentagonal mirror 10A is provided with a recess 21 and flanges 22, as shown in FIGS. 1 through 3. The recess 21 is defined by right and left inner side surfaces 23, a rear surface 24 and an oblique front surface 25. The recess 21 is also provided with a bottom having right and left stepped portions 26a and 26b.

The mirror receptacle 20A is provided on its side wall 30 with an insertion groove 31 in which an indicator 40 within a finder is inserted. The insertion groove 31 is defined by a stepped portion 35 having a predetermined depth with respect to the plane of the side wall 30 and the stepped portion 26a exposed below the stepped portion 35 so that the indicator 40 (casing 39) can be opened when it is inserted into the recess 21. The insertion groove 31 has an upper narrow opening 32 and a lower wide opening 33 of larger width. One side 36 of the stepped portion 26a has a deeper recess than the stepped portion 35. Numerals 55 and 59 designate a connector terminal and an opening in which an eyepiece 5 (FIG. 11) is fitted, respectively.

The indicator 40 within the finder is comprised of a fixed sub-assembly having an FPC (flexible printed circuit) board 42, a casing 39, and an information indicating plate 52, the information indicating plate 52 being used for indicating photographic information with letters, characters, symbols, etc. The indicator 40 is detachably attached to the mirror receptacle 20A.

Figure 4:
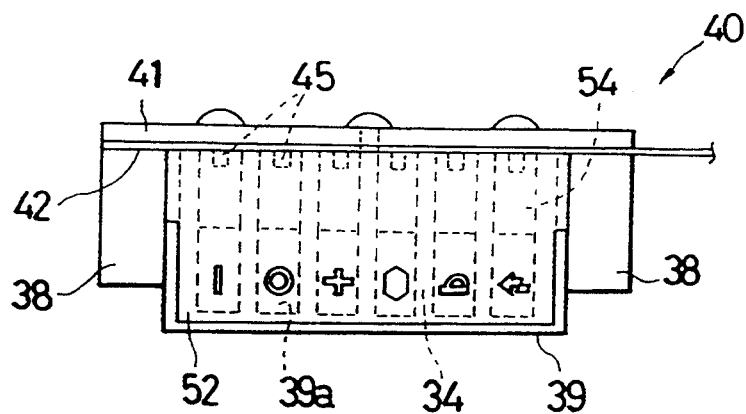
FIGS. 4 and 5 are a plan view and a front elevational view of an indicator within a finder, according to the present invention, respectively.
Figure 5:
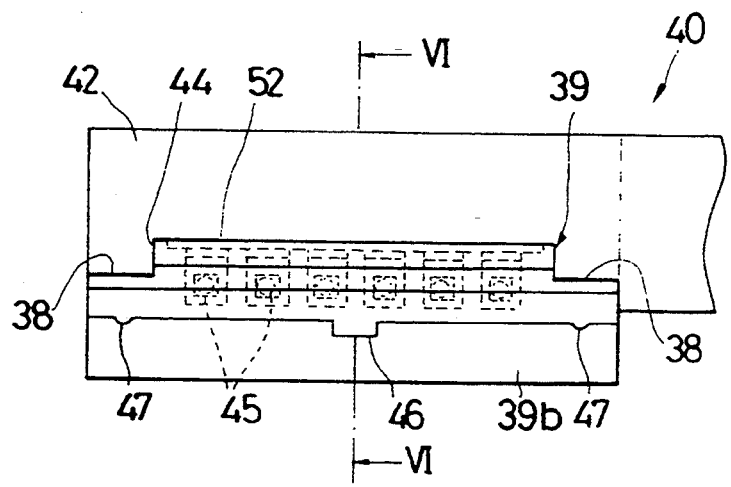
Figure 6:
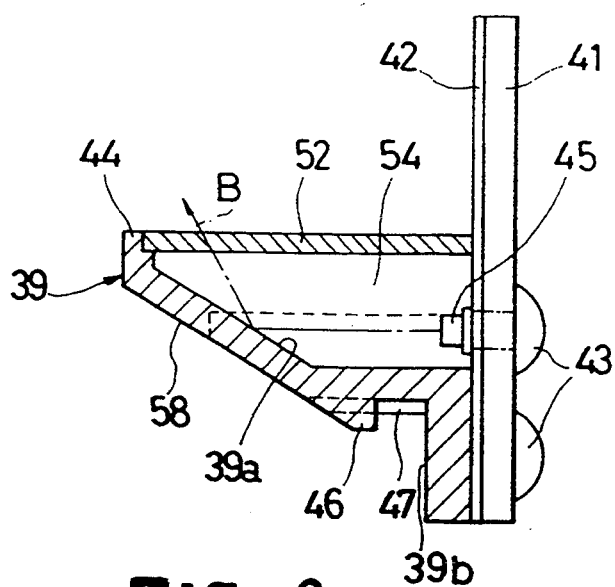
FIG. 6 is a sectional view taken along the line VI—VI in FIG. 5.
Figure 7:
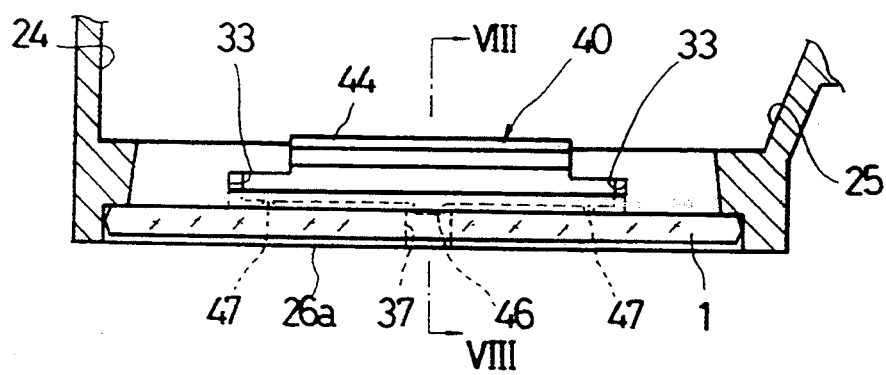
FIG. 7 is a front elevational view of a mounting portion of an indicator within a finder, according to the present invention.

The FPC board 42 is located between the casing 39 and back cover 41 to which the casing 39 is welded by a thermal adhesion through the FPC board 42, as shown in FIGS. 4 through 6. The casing 39 is divided into a plurality of portions by separation walls 34 spaced from one another at a predetermined distance. The information indicating plate 52 is mounted to the upper portion of the casing 39 to define a plurality of separate chambers 54 which are separated by the separation walls 34. Each of the separate chambers 54 has an oblique front surface 39a and an LCD 45 provided on the FPC board 42 to emit light toward the associated oblique front surface 39a. Numerals 43 and 39b designate masses of welded material and a lower vertical surface, respectively.

The separate chambers 54 including the oblique front surfaces 39a are wholly coated with a reflecting layer, aluminum or a white material of some sort for example, by a vacuum evaporation process so that the light emitted from the respective LED's 45 may be effectively reflected. The LED's 45 are electrically connected to the printed circuit (not shown) of the FPC board 42. The light emitted from the LED's 45 is mainly directed toward the corresponding front oblique surfaces 39a which reflect the light mainly in the direction B in FIG. 6. The portion of the information indicating plate 52 through which the light reflected by the oblique surface 39a is transmitted is provided thereon with letters, characters or symbols, so that the necessary information represented by the letters or symbols, etc., appears when illuminated with light. Alternatively, it is possible to provide reflecting surfaces by painting the inner surfaces of the separate chambers 54. Note that the scales of FIGS. 5 and 6 are the same.

Figure 8:
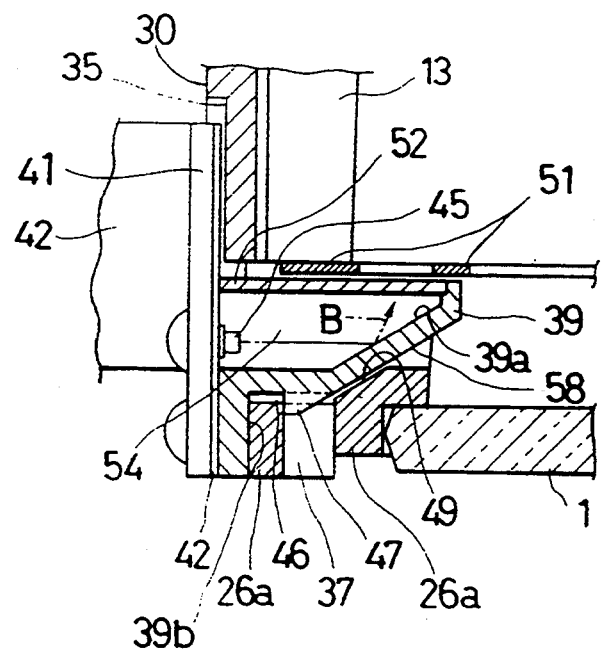
FIG. 8 is a sectional view taken along the line VII—VII in FIG. 7.

The casing 39 has a shape corresponding to the insertion groove 31 in front elevational view, and has a center projection 44 which can be fitted in the small width opening 32 of the insertion groove 31. The casing 39 also has right and left flat portions 38 on opposite sides of the center projection 44 which are to be fitted in the larger width opening 33. The casing 39 is provided on its front end with an oblique end surface 58 parallel with the internal oblique surfaces 39a. The casing 39 is also provided with a center engaging hook 46 and small projections 47 located on opposite sides of the center engaging hook 46, at the lower end of the oblique surface 58. The small projections 47 are semicircular in cross sectional shape. When the casing 39 is inserted in the insertion groove 31, the engaging hook 46 is engaged in a corresponding engaging hole 37 (FIG. 8) formed on the stepped portion 26a to prevent the casing 39 from accidentally coming out of the insertion groove 31. A pair of projections 47 contribute to the stabilization of the casing 39 in the lateral direction when the engaging hook 46 is engaged in the engaging hole 37.

The engaging hole 37 on the stepped portion 26a is positioned so that when the casing 39 is completely inserted in the insertion groove 31 and the FPC board 42 of the indicator 40 comes into contact with the stepped portion 35, the engaging hook 46 can be fitted in the engaging hole 37. Numeral 49 designates the oblique abutting surface which is formed on the stepped portion 26a to correspond to the oblique surface 58, so that the oblique abutting surface 49 can be brought into contact with the oblique surface 58.

Upon attachment of the indicator 40 to the mirror receptacle 20A, the FPC board 42, the information indicating plate 52, and the casing 39 are made integral thereby forming a sub-assembly. The sub-assembly (indicator 40) thus obtained is inserted in the insertion groove 31 in such a manner that the projection 44 of the casing 39 is fitted in the narrow opening 32 and the flat portions 38 of the casing 39 are fitted in the wide opening 33, respectively. Consequently, since the stepped portion 26a is thin and accordingly flexible, it is elastically bent downward by the engaging hook 46 so that the elastically deformed stepped portion 26a permits the casing 39 to enter. Thereafter, when the FPC board 42 comes into contact with the stepped portion 26a and the lower vertical surface 39b of the casing 39, the engaging hook 46 is engaged in the engaging hole 37 so that the stepped portion 26a is returned to the initial position, i.e. the horizontally flat state. As a result, the indicator 40 is firmly mounted to the mirror receptacle 20A by the snap arrangement described above.

In this state, the projections 47 abut against the stepped portion 26a, and accordingly, the casing 39 is stably held without moving in the lateral direction. The back cover 41 and the FPC board 42 are brought into contact with the recessed stepped portion 35. Since the stepped portion 35 is recessed from the plane of the side face 30, the amount of the protrusion of the back cover 41 (and the FPC board 42) from the plane of the side face 30 is minimized. The mirror receptacle 20A can be secured to the camera body, either before or after the indicator 40 is mounted thereto, by set screws (not shown), for example, which are screwed into the camera body through the threaded holes 22a formed in the flanges 22.

Thereafter, the connector terminal 55 of the FPC board 42 is electrically connected to another FPC board (not shown) and the hollow pentagonal mirror 10A is inserted in the recess 21 while moving the oblique surface 15 and the side surface 13 along the oblique surface 25 and the inner side surface 23, thereby making the hollow pentagonal mirror 10A integral with the mirror receptacle 20A. In this state, if any one of the LED's 45 is turned ON, light emitted therefrom is reflected by the associated oblique surface 39a in the direction B (FIG. 6). Consequently, an image of the necessary information (letters, symbols, etc.) illuminated with the reflected light is formed on a field frame 51 secured to the pentagonal mirror 10A. Accordingly, an observer can observe the letters or symbols, etc. which are illuminated, through the optical path, in the finder field of view and the eyepiece 5 (FIG. 11), on one side of the field of view.

As can be understood from the foregoing, according to the present invention, the sub-assembly of the indicator 40 within the finder can be mounted to the camera body by simply inserting the same in the insertion groove 31. This results in a simple, inexpensive and effective assembly operation.

Although the invention has been described with reference to particular means, materials and embodiments, it is to be understood that the invention is not limited to the particulars disclosed and extends to all equivalents within the scope of the claims.

I claim:

1. A camera comprising:
   a camera body
   a viewfinder optical system;
   a mirror receptacle;
   an insertion slot on one side of said mirror receptacle, said insertion slot being formed with a wide opening and a narrow opening;
   indicator means for indicating photographic information inserted in said insertion slot and engaged therein so as to form a subassembly with said mirror receptacle prior to attachment of said mirror receptacle to said camera body, said indicator means including a light source, a photographic information indicating plate, and a light reflecting surface for reflecting light emitted from said light source for illuminating said indicating plate with light emitted from said light source; and,
   means for supporting said mirror receptacle/indicator means subassembly by said camera body, with said indicator means supported within said view finder optical system.

2. The camera of claim 1 wherein said means for engaging said indicator means with said mirror receptacle includes a snap engagement means.

3. A camera in accordance with claim 1 further comprising a hollow pentagonal mirror received in said mirror receptacle.

4. A camera in accordance with claim 1, wherein said indicator means further comprises a flexible printed circuit board having a connector terminal which can be electrically connected to another connector when said indicator means is mounted to a body of said camera.

5. A camera in accordance with claim 1, wherein a wide opening and a narrow opening are formed on said insertion groove.

6. A camera in accordance with claim 1 wherein said indicator means includes a projection to be fitted in said narrow opening of said insertion slot; and flat portions on opposite sides of said projection to be fitted in said wide opening.

7. A camera in accordance with claim 1, wherein said mirror receptacle comprises a recess with stepped portions.

8. A camera in accordance with claim 7, wherein said insertion slot is connected to one of said stepped portions.

9. A camera in accordance with claim 8, wherein said means for inserting and engaging said sub-assembly means with said camera comprises an engaging hole formed in one of said stepped portions.

10. A camera in accordance with claim 9, wherein said indicator means comprises a casing including an engaging hook to be engaged in said engaging hole.

11. A camera in accordance with claim 10, wherein said casing of said indicator means comprises a plurality of separate chambers separated by respective separation walls.

12. A camera in accordance with claim 11, wherein said indicator means comprises light sources provided in said separate chambers.

13. A camera in accordance with claim 12, wherein each of said separate chambers is provided with an oblique reflecting surface which reflects light emitted from the respective said light sources in a direction of an eyepiece of an optical path of said viewfinder optical system.

14. A camera in accordance with claim 13, wherein said light sources are light emitting diodes which emit light toward said oblique reflecting surfaces of said separate chambers.

15. A camera in accordance with claim 14, wherein said information indicating plate is provided on said casing of said indicator means and is provided thereon with predetermined information in the form of alphanumeric symbols which permit passage of light, so that light emitted from said light sources and reflected by said oblique reflected surfaces is transmitted through said alphanumeric symbols.

16. A camera in accordance with claim 15, wherein said separate chambers are coated with reflective layers of a white material by a vacuum evaporation process thereby defining said oblique reflecting surfaces.

17. A camera in accordance with claim 15, wherein said separate chambers are coated with reflected layers of aluminum by a vacuum evaporation process thereby defining said oblique reflecting surfaces.

* * * * *